United States Patent [19]

Nonoyama et al.

[11] Patent Number: 5,483,662
[45] Date of Patent: Jan. 9, 1996

[54] SPADE SIGNAL RECEIVING STATION

[75] Inventors: Akiko Nonoyama; Yuji Goto, both of Tokyo, Japan

[73] Assignee: NEC Corporation, Japan

[21] Appl. No.: 210,020

[22] Filed: Mar. 18, 1994

[30] Foreign Application Priority Data

Mar. 19, 1993 [JP] Japan .................................. 5-059997

[51] Int. Cl.[6] .................................................. H04B 1/16
[52] U.S. Cl. ........................... 455/3.2; 455/132; 455/140; 455/141; 455/182.1; 455/183.1; 455/197.1; 455/289; 455/314
[58] Field of Search .......................... 455/3.2, 8, 9, 12.1, 455/17, 34.1, 53.1, 54.1, 132, 133, 140, 141, 136, 280–282, 289, 291, 293, 276.1, 314, 311, 182.1, 182.2, 183.1, 187.1, 190.1, 192.1, 197.1; 371/8.1, 8.2

[56] References Cited

U.S. PATENT DOCUMENTS 5,020,132  5/1991  Nazarenk et al. ......................... 455/17

5,301,352  4/1994  Nakagawa et al. ...................... 455/3.2

FOREIGN PATENT DOCUMENTS 0324363  4/1989  European Pat. Off. .
3-110931  5/1991  Japan ........................................ 455/8
4-18826  1/1992  Japan ........................................ 455/8
2230406  6/1990  United Kingdom .

*Primary Examiner*—Chi H. Pham
*Attorney, Agent, or Firm*—Ostrolenk, Faber, Gerb & Soffen

[57] ABSTRACT

In an earth-based receiving station for receiving radio signals transmitted from a satellite relay station, a common first frequency converter and at least two receivers are provided. One of the receivers is used as a control receiver to receive a CSC carrier frequency transmitted from the satellite, to generate a first local oscillator frequency phase-locked to the CSC carrier frequency, and to supply the first local oscillator frequency to the common first frequency converter. Other receivers are used as channel receivers for receiving channel frequencies. In case when the control receiver is in trouble, any other receiver can be used as a control receiver.

1 Claim, 3 Drawing Sheets

SPADE SIGNAL RECEIVING STATION

BACKGROUND OF THE INVENTION

This invention relates to an earth-based receiving station for receiving radio signals from a satellite relay station.

In an SCPC (Single Channel Per Carrier) system used as a satellite communication system, voice channels are allocated with 45 kHz separation. Since this separation is very narrow for high carrier frequencies in GHz band, and since utmost frequency accuracy is required for demodulating PSK modulated signals used in satellite communication, frequency tuning should be very accurate in receivers for receiving these channels.

In an SPADE (Single channel per carrier PCM multiple Access Demand assignment Equipment) system, the control station assigns a communication channel in accordance to access demand from an earth-based transmitting station. For this demand/assign communication between the control station and earth-based communication stations, a CSC (common signalling channel) is used.

In order to facilitate accurate tuning, the CSC is continually transmitted from the control station.

Earth-based transmitting stations transmit access demand signals to the control station by CSC in the up-linked channels.

Earth-based receiving stations in the system are listening CSC transmitted from the control station, and when the control station assigns a receiving channel by CSC to a receiving station, the receiving station tunes a channel receiver frequency to the assigned channel.

All the communication channels are transmitted in a burst type waves.

FIG. 2 illustrate a block diagram of such receiving station of a prior art.

Radio frequency signals received by an antenna 1 are converted to first intermediate frequency signals by a first frequency converter 2. The first intermediate frequency signals from the converter 2 are supplied through a distributor 3 to a control receiver 5 and a channel receiver 6.

Same numerals in the receivers 5 and 6 indicate same parts, and as for receiver discrimination, a numeral indicating the receiver is connected by a hyphen.

The control receiver 5 receives the CSC, phase-locks a VCO 44 to the CSC carrier frequency, and delivers output of the VCO 44 as a first local oscillator frequency to the converter 2. A phase-lock loop for the VCO 44 is a closed circuit comprising VCO 44, first frequency converter 2, second frequency converter 40-5, second intermediate frequency amplifier 41-5, demodulator 42-5, low-pass-filter 43, VCO 44. Frequency synthesizer 48-5 supplies a second local oscillator frequency to the second frequency converter 40-5.

When the CSC carrier frequency is $F_{pr}$, the first local oscillator(VCO) frequency is $F_1$, the second local oscillator frequency is $F_{2p}$, center frequency of the second intermediate frequency amplifier is $F_2$, and a demodulator 42-5 detects phase error of output of the second intermediate frequency amplifier 41-5, the VCO is phaselocked to the CSC carrier frequency in a relation $F_{pr}-F_1-F_{2p}=F_2 \ldots$ (1). Since pull-in range of the phase-lock loop is very narrow, a crystal controlled oscillator is used as the VCO 44.

An amplitude level at an output of the second intermediate frequency amplifier 41-5 is detected by a level detector 45. The detected level is supplied to the converter 2 for feed-back controlling gain of the converter 2.

Thus, all the channel frequencies in a radio frequency band are accurately converted to a first intermediate frequency band. The first intermediate frequency signals are supplied to the channel receiver 6, and a receiving frequency of a channel receiver is determined by the second local oscillator frequency which is supplied from a synthesizer 48-6.

The channel receiver 6 is listening CSC, and when the channel receiver 6 receives a command on CSC for assigning a channel frequency, this command is demodulated by a demodulator 42-6, is decoded by a decoder in a data processor 46, and controls a logic 47-6 in accordance with the assigned channel. The logic 47-6 changes output frequency of the synthesizer 48-6 to generate a second local oscillator frequency to tune for receiving the assigned channel frequency.

When an earth-based receiving station receives plural communication channels simultaneously, plural channel receivers 6 are provided as shown in FIG. 3.

There is a vulnerability in the earth-based receiving station of the prior art. When the control receiver 5 is in a trouble, and the first local oscillator frequency supplied from the VCO 44 is unreliable, all the channel receivers 6 suffer the trouble. And when a standing spare is provided for the control receiver to avoid the vulnerability, the standing spare can not be used as a channel receiver even when all other channel receivers are busy.

SUMMARY OF THE INVENTION

Therefore, an important object of the invention is to eliminate the vulnerability of the prior art, and materialize an earth-based receiving station in which a standby spare of the control receiver is provided, and the standby spare of the control receiver is operating as a channel receiver in the station as long as there is no trouble in the control receiver of current use.

Another object of this invention is to provide means for instantly converting the standing spare of the control receiver to a control receiver of current use.

In order to achieve these objects, at least two receivers are provided, and each of the at least two receivers can be designated to operate as the control receiver or the channel receiver.

In a preferred embodiment of this invention, a SPADE signal receiving station includes a first frequency converter for converting radio frequency signals from a satellite relay station composed of CSC and communication channels according to the SPADE system to corresponding signals in a first intermediate frequency band.

Each of the at least two receivers has:

a second frequency converter for converting signals of a selected channel from the CSC and the communication channels in the first intermediate frequency signals to signals of predetermined second intermediate frequency band, a frequency synthesizer for generating a second local oscillator frequency corresponding to the selected channel for supplying to the second frequency converter, a second intermediate frequency amplifier having a predetermined band width for amplifying the signals of the predetermined second intermediate frequency band, a demodulator for demodulating output of the second intermediate frequency amplifier and for detecting phase error of the output, a VCO for generating first local oscillator frequency to be supplied to the first frequency converter when the selected channel is the CSC, composing a phase lock loop with the first frequency converter, the second frequency converter, the second frequency amplifier, the demodulator and a low-pass filter, and a level detector for detecting amplitude levels of the output of the second intermediate frequency amplifier to be supplied to a first intermediate frequency amplifier in the first frequency converter, composing a negative-feedback-control loop with the first intermediate frequency amplifier, the second frequency converter, and the second intermediate amplifier;

The SPADE signal receiving station also includes:

a first selector for connecting a selected frequency from generated frequencies of the VCOs of the at least two receivers to the first frequency converter as the first local oscillator frequency;

a second selector for connecting a selected level detector output from level detector outputs of the at least two receivers to the first intermediate amplifier in the first frequency converter; and means for selecting one of the at least two receivers as control receiver, setting the second local oscillator frequency of the control receiver to that corresponding to the CSC, selecting the generated frequency of the VCO of the control receiver as the selected frequency to be connected to the first frequency converter by the first selector, and selecting level detector output of the control receiver as the selected level detector output to be connected to the first intermediate amplifier by the second selector.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Figure 1:
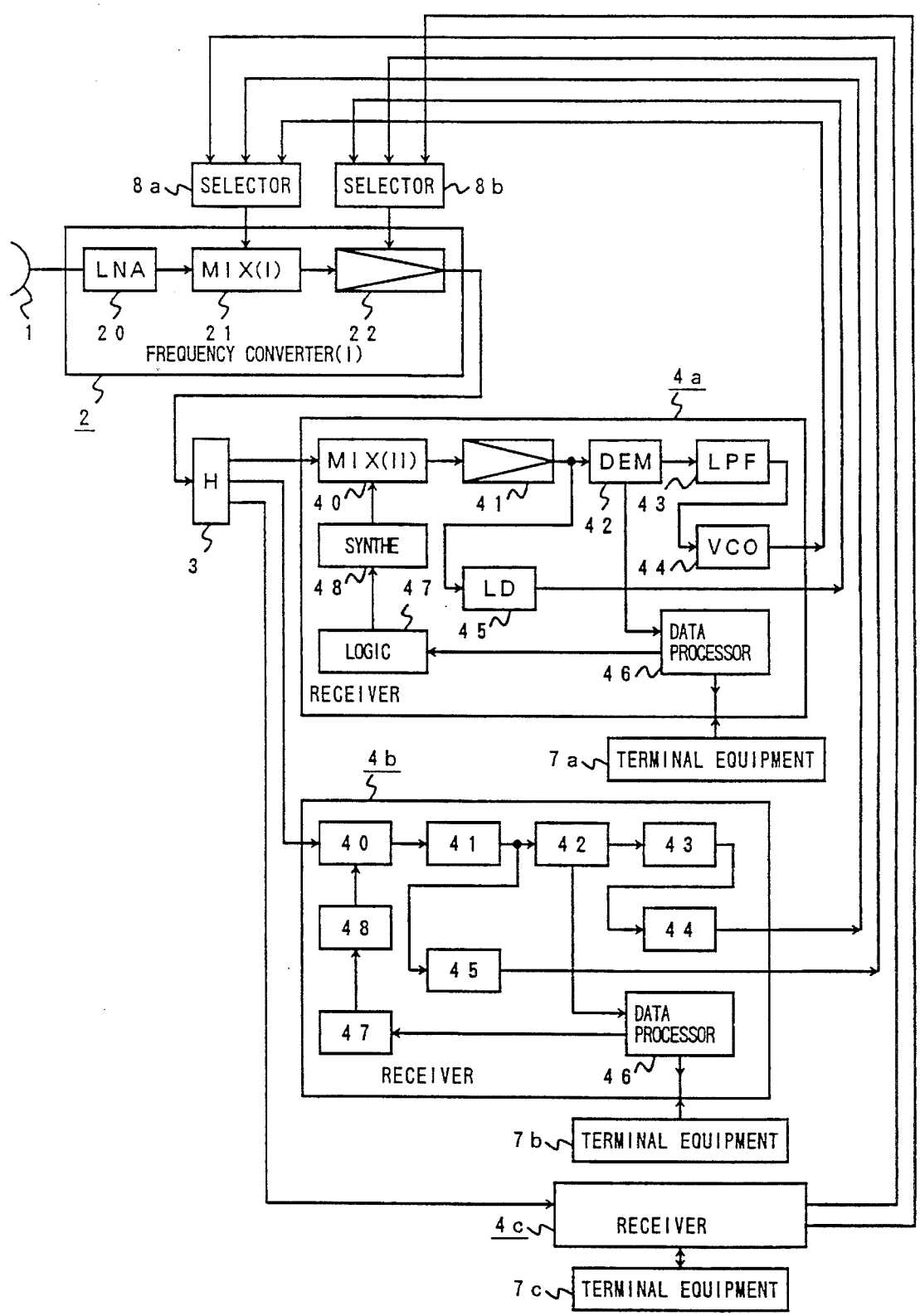
FIG. 1 shows a block diagram of an embodiment of this invention.
Figure 2:
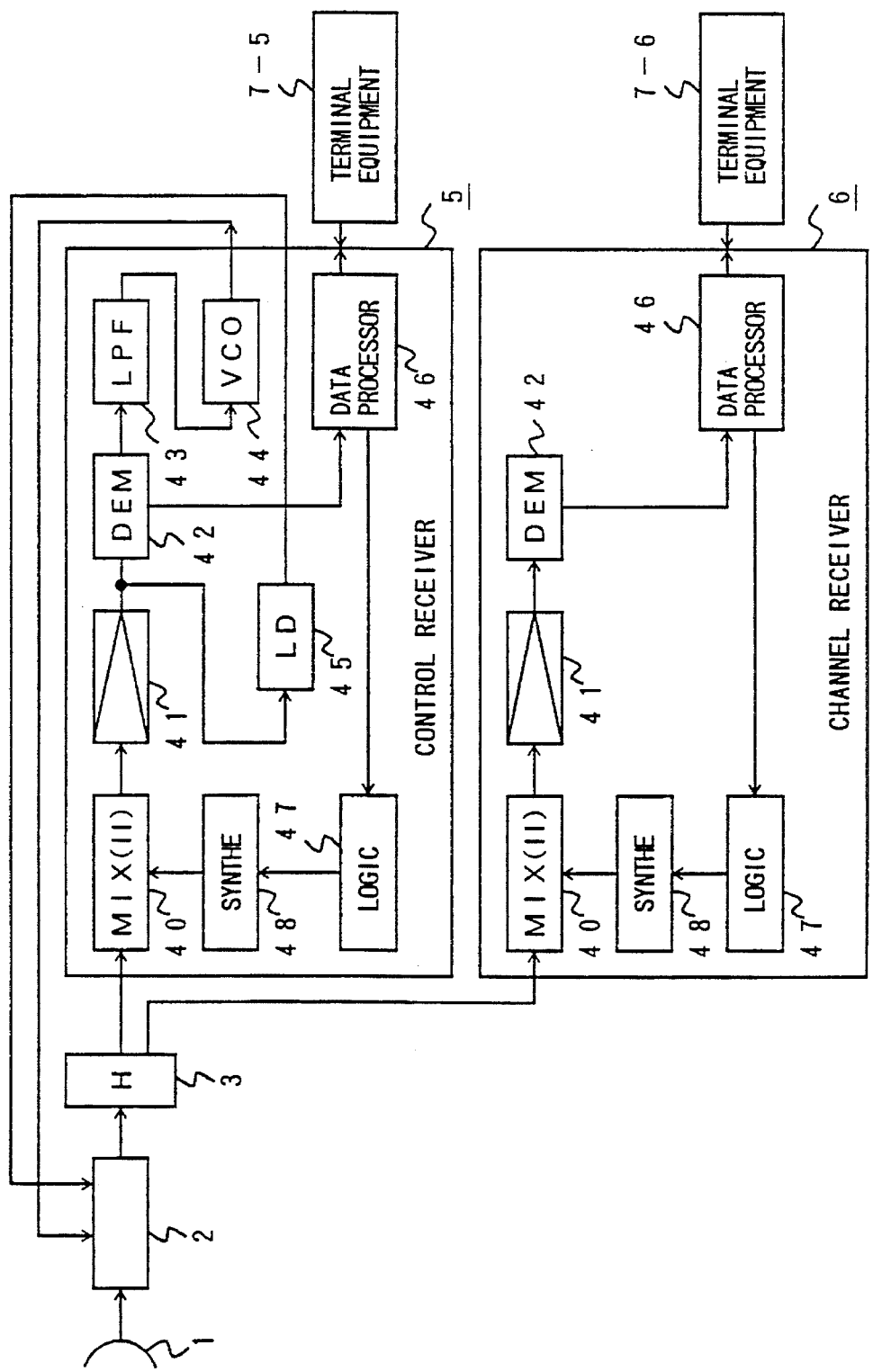
FIG. 2 shows a block diagram of an earth-based receiving station of a prior art.
Figure 3:
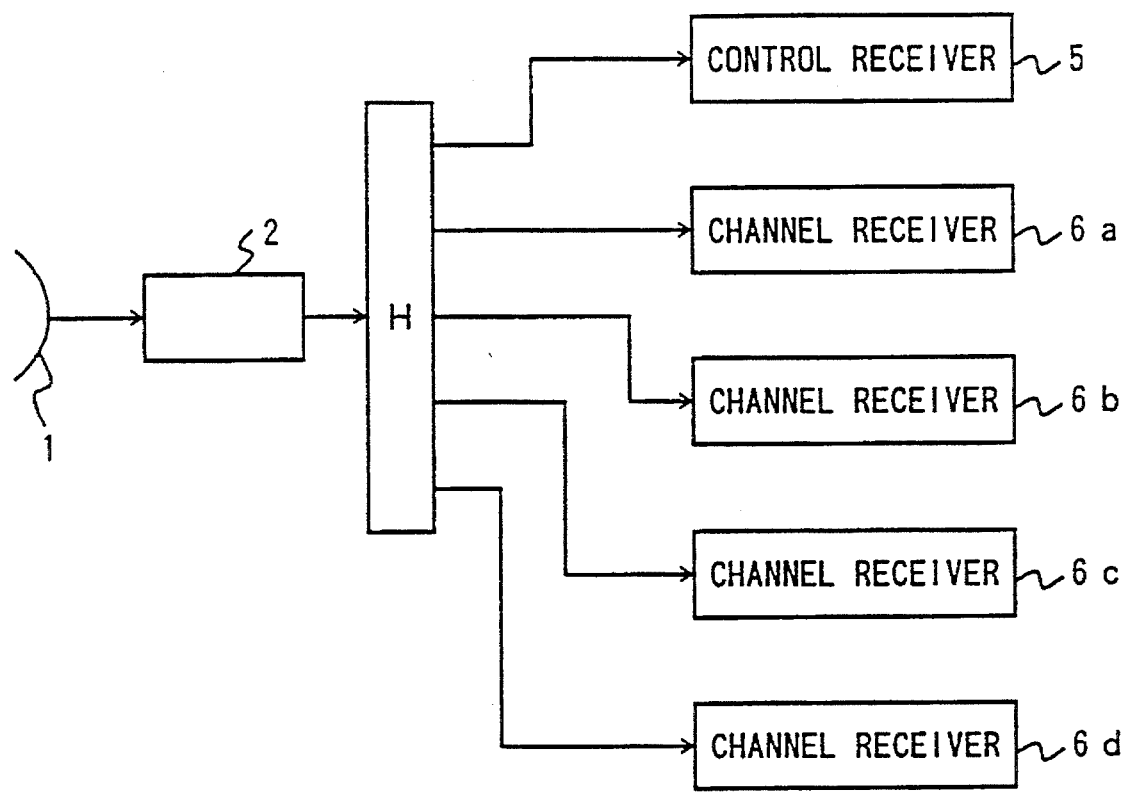
FIG. 3 shows another block diagram of an earth-based receiving station of a prior art.

Referring to FIG. 1, there is shown an embodiment of this invention. The same numerals in FIG. 1 and FIG. 2 indicate the same or the corresponding parts.

The first frequency converter 2 of the present invention comprises a low noise amplifier 20 for amplifying radio frequency signals received at the antenna 1, a first mixer 21, and a broad band first intermediate frequency amplifier 22.

Output of the converter 2 is supplied through a distributor 3 to receivers 4a, 4b, and 4c.

Suppose that a decision is made in a host computer(not shown in the drawing) to use the receiver 4a as a control receiver, the receiver 4c as a channel receiver, and the receiver 4b as a general purpose standing spare.

In the receiver 4a, the synthesizer 48-4a is controlled to generate a second local oscillator frequency to tune to the CSC frequency. The control is delivered through the terminal equipment 7a, the data processor 46-4a, and the logic 47-4a. In equation (1), this second local oscillator frequency is $F_{2p}$.

The demodulator 42 of a receiver 4 is a demodulator for PSK modulated signals, and generater a phase error at a frequency $F_2$ in equation (1). The phase error output is delivered to the low-pass-filter 43-4a.

A selector 8a connects output of the VCO 44-4a to the converter 2, and a selector 8b connects output of the level detector 45-4a to the converter 2. A phase-lock loop is dosed from VCO 44-4a, mixer 21, second frequency converter 40-4a, second intermediate frequency amplifier 41-4a, demodulator 42-4a, low-pass-filter 43-4a, to the VCO, and a negative-feedback-control loop is closed from level detector 45-4a, first intermediate frequency amplifier 22, second frequency converter 40-4a, second intermediate amplifier 41-4a, to the level detector 45-4a.

Thus, an accurate first intermediate frequency signals with a suitable amplitude is supplied to receivers 4b and 4c. In a channel receiver 4c, the synthesizer 48-6 is controlled to tune to CSC frequency, through the terminal equipment 7c, the data processor 46-4c, and the logic 47-4b. In the receiver 4b, the synthesizer 48-4b is controlled to tune to CSC, but demodulated signals are ignored in the data processor 46-4b, as long as the receiver 4c is listening CSC.

When a message of channel assignment is received at the receiver 4c, the message is demodulated by the demodulator 42-4c. The data processor 46-4c decodes the message and controls the synthesizer 48-4c to tune to the assigned channel frequency. When the receiver 6 ceases to listen CSC, the dual purpose receiver 4b comes to operate as another channel receiver and listens CSC.

In case when the receiver 4a which is operating as a control receiver has trouble, for example, a failure of VCO phase-lock, the host computer connects output of VCO 44-4b to the first mixer 21 through the selector 8b, and connects output of the level detector 45-4b to the first intermediate frequency amplifier 22 through the selector 8b.

When the trouble in the receiver 4a is such a trouble as a failure of VCO phase-lock, the receiver 4a can still be used as a channel receiver, and the trouble in the receiver 4a has no harm on the earth-based receiving station.

In an earth-based receiving station where traffic volume is small, the receiver 4c in FIG. 1 is omitted, and the receiver 4a is used as a control receiver while the receiver 4b is used as a channel receiver. When the control receiver has a trouble and the trouble is in the VCO 44-4a, the receiver 4a is used as a channel receiver and the receiver 4b is used as a control receiver.

What is claimed is:

1. A SPADE (Signal channel per carrier PCM multiple Access Demand assignment Equipment signal receiving station comprising:

a first frequency converter for converting radio frequency signals from a satellite relay station including a CSC (Common Signal Channel) and communication channels according to a SPADE system to corresponding signals in a first intermediate frequency band;

at least two receivers, each of said at least two receivers having, a second frequency converter for converting signals of a selected channel from said CSC and said communication channels in said first intermediate frequency signals to signals of a predetermined second intermediate frequency band, a frequency synthesizer for generating a second local oscillator frequency corresponding to said selected channel for supplying to said second frequency converter, a second intermediate frequency amplifier having a predetermined bandwidth for amplifying said signals of said predetermined second intermediate frequency band, a demodulator for demodulating output of said second intermediate frequency amplifier and for detecting phase error of said output, a VCO for generating first local oscillator frequency to be sent to said first frequency converter when said selected channel is said CSC, composing a phase lock loop with said first frequency converter, said second frequency converter, said second frequency amplifier, said demodulator and a low-pass-filter, and a level detector for detecting amplitude level of said output of said second intermediate frequency amplifier to be sent to a first intermediate frequency amplifier in said first frequency converter, composing a negative-feedback-control loop with said first intermediate frequency amplifier, said second frequency converter, and said second intermediate amplifier;

a first selector for connecting a selected frequency from generated frequencies of said VCOs of said at least two receivers to said first frequency converter as said first local oscillator frequency;

a second selector for connecting a selected level detector output from level detector outputs of said at least two receivers to said first intermediate amplifier in said first frequency converter; and means for selecting a receiver from said at least two receivers as control receiver, setting said second local oscillator frequency of said control receiver to that corresponding to said CSC, selecting a generated frequency of said VCO of said control receiver as said selected frequency to be sent to said first frequency converter by said first selector, and selecting level detector output of said control receiver as said selected level detector output to be sent to said first intermediate amplifier by said second selector.

\* \* \* \* \*